(12) United States Patent
Nakano

(10) Patent No.: US 6,224,508 B1
(45) Date of Patent: May 1, 2001

(54) TRUNNION OF A TOROIDAL CONTINUOUSLY VARIABLE TRANSMISSION AND MANUFACTURING PROCESS THEREOF

(75) Inventor: Masaki Nakano, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/371,790

(22) Filed: Aug. 10, 1999

(30) Foreign Application Priority Data

Aug. 11, 1998 (JP) .................................. 10-227073

(51) Int. Cl.$^7$ .............................. F16H 15/38; B21K 1/42
(52) U.S. Cl. .............................. 476/40; 29/892; 74/89.22; 474/152; 474/153
(58) Field of Search .............................. 29/892; 74/89.22; 474/152, 153; 476/40, 46

(56) References Cited

U.S. PATENT DOCUMENTS

| 4,694,704 | 9/1987 | Kraus | ....................................... 74/200 |
| 5,803,857 | * 9/1998 | Yamamoto | .............................. 475/192 |

FOREIGN PATENT DOCUMENTS

| 0 248 515 | 12/1987 | (EP) . |
| 0 882 910 | 12/1998 | (EP) . |
| 4-366049 | 12/1992 | (JP) . |
| 7-253145 | 10/1995 | (JP) . |

OTHER PUBLICATIONS

Patent Abstracts of Japan, vol. 018, No. 254 (M1605), May 16, 1994 & JP 06 034009 A (Mazda Motor Corp).

* cited by examiner

Primary Examiner—Allan D. Herrmann
(74) Attorney, Agent, or Firm—Foley & Lardner

(57) ABSTRACT

A trunnion (3) of a toroidal continuously variable transmission comprises a pulley (38) having a pulley groove (30) and a notch (37) crossing the pulley groove (38). The trunnion (3) rotates in synchronism with another trunnion by looping an endless wire around the pulley groove of each trunnion (3) and by engaging a large diameter part of the endless wire with the notch (37). After the trunnion (3) is formed by die forging, a rotary tool (90) is first aligned with a boundary interface (31'A, 31'B) between the pulley groove (30) and notch (37). The tool (90) is then rotated while it is moved forward in the axial direction of the tool (90), and the boundary interface (31'A, 31'B) is cut to a predetermined position.

6 Claims, 5 Drawing Sheets

TRUNNION OF A TOROIDAL CONTINUOUSLY VARIABLE TRANSMISSION AND MANUFACTURING PROCESS THEREOF

FIELD OF THE INVENTION

The present invention relates to a trunnion of a toroidal continuously variable transmission for vehicles and a manufacturing process for the trunnion.

BACKGROUND OF THE INVENTION

Tokkai Hei 4-366049 published by the Japanese Patent Office in 1992 discloses a toroidal continuously variable transmission for vehicles wherein the ration of the rotation speed of an input disk to the rotation speed of an output disk, i.e., a speed ratio, is continuously varied by varying the gyration angle of a pair of power rollers gripped between the input disk and output disk. The power rollers are respectively supported by trunnions at a position facing each other.

These trunnions must be rotated synchronously. In this context, Tokkai Hei 7-253145 published by the Japanese Patent Office in 1995 discloses a technique wherein a pulley is formed in the trunnions, and the trunnions are synchronously rotated by looping an endless wire around a pulley groove of the pulley. The slipping of the endless wire in the circumferential direction is prevented by engaging a large diameter part of the endless wire with a notch formed in a pulley groove. Therefore, in order to accurately synchronize the gyration angle of the trunnions, the notch must be formed precisely in the circumferential direction.

However, when the trunnions are formed by forging, casting or sintering, the precision of the notch is poor.

Therefore, the notch has to be machined after forming, but if the notch is machined by driving a tool in the axial direction while the trunnion is rotated around its rotation axis as the notch runs in a circumferential direction, the number of indexing steps of machining positions and positioning steps increases and the productivity declines.

It is therefore an object of this invention to machine the notch which engages with the large diameter part of the endless wire to a high precision without reducing productivity.

In order to achieve the above object, this invention provides a trunnion of a toroidal continuously variable transmission and a manufacturing process for the trunnion. The trunnion comprises a support having a hole therethrough comprising a pulley with a pulley groove and a notch crossing the pulley groove, a first shaft on the top of the support, and a second shaft part on the bottom of the support that is coaxial with the first shaft part, the notch comprising an arc portion and two straight portions, one of the straight portion being formed on one side of the arc portion and the other of the straight portion being formed on the other side of the arc portion. The process comprises forming said pulley groove and said notch by forging, casting or sintering, aligning a rotary tool for machining a flat surface by a blade provided on an end face so as to face a boundary interface between the pulley groove and notch, and rotating the tool while moving the tool forward in the axial direction of the tool so as to cut the boundary interface to a predetermined position.

The details as well as other features and advantages of this invention are set forth in the remainder of the specification and are shown in the accompanying drawings.

DESCRIPTION OF THE PREFERRED EMBODIMENTS

Figure 1:
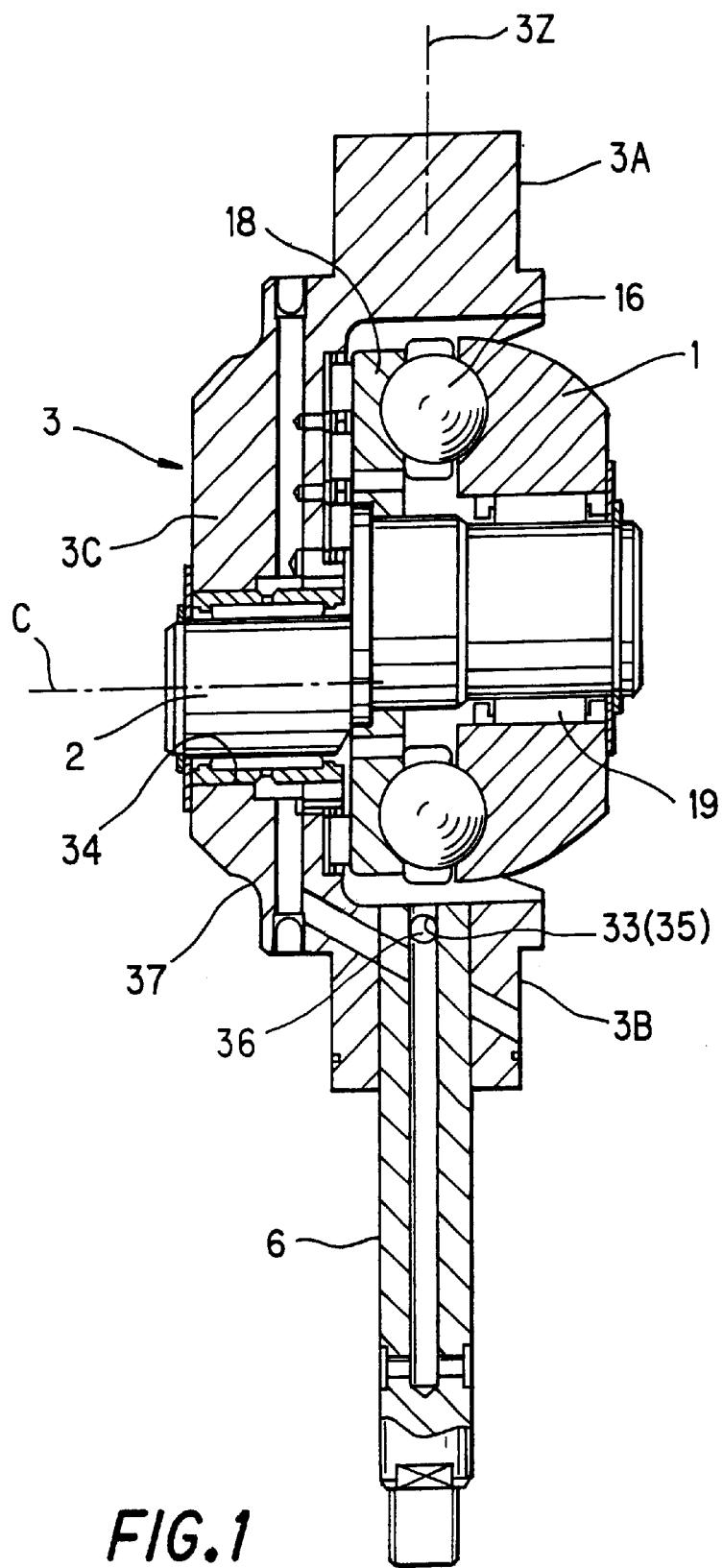
FIG. 1 is a sectional view of a trunnion and a power roller of a toroidal continuously variable transmission according to this invention.

Referring to FIG. 1 of the drawings, a trunnion 3 comprises a support 3C which supports a power roller 1 such that it is free to rotate, and shaft parts 3A and 3B formed on the top and bottom of the support 3C. The support 3C and shaft parts 3A, 3B are formed in one piece by die forging.

A through-hole 34 is formed in the support 3C. One end of a pivot shaft 2 is inserted in the through-hole 34, and the pivot shaft 2 pivots around an axis C. The power roller 1 is supported at the other end of the pivot shaft 2 via a radial bearing 19. An outer ring 18 and ball bearing 16 are interposed between the support 3C and power roller 1, and support a thrust load.

When the trunnion 3 displaces in the direction of an axis 3Z, the power roller 1 gyrates between the input disk and output disk, not shown, and the ratio of the rotation speed of the input disk to the rotation speed of the output disk, i.e., the speed ratio, varies continuously.

Figure 2:
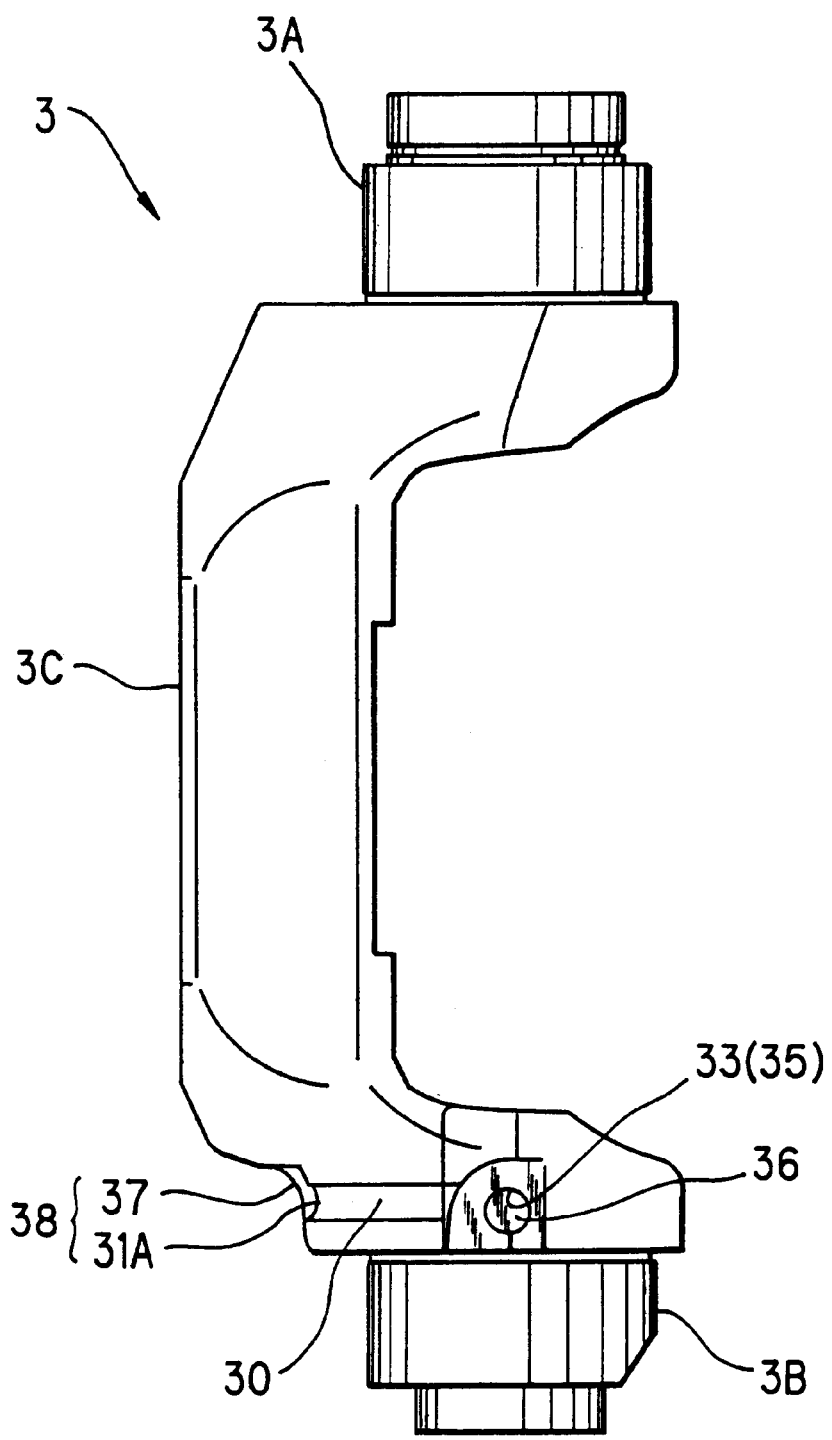
FIG. 2 is a front view of the trunnion.

The shaft part 3B is formed in a cylindrical shape, as shown in FIG. 2. A rod 6 of a hydraulic actuator, not shown, is inserted into the shaft part 3B. The rod 6 and trunnion 3 are joined by pressing a pin 36 into a pinhole 33 formed in the support 3C and a pinhole 35 formed in the rod 6 which are formed in the support 3C.

Figure 3:
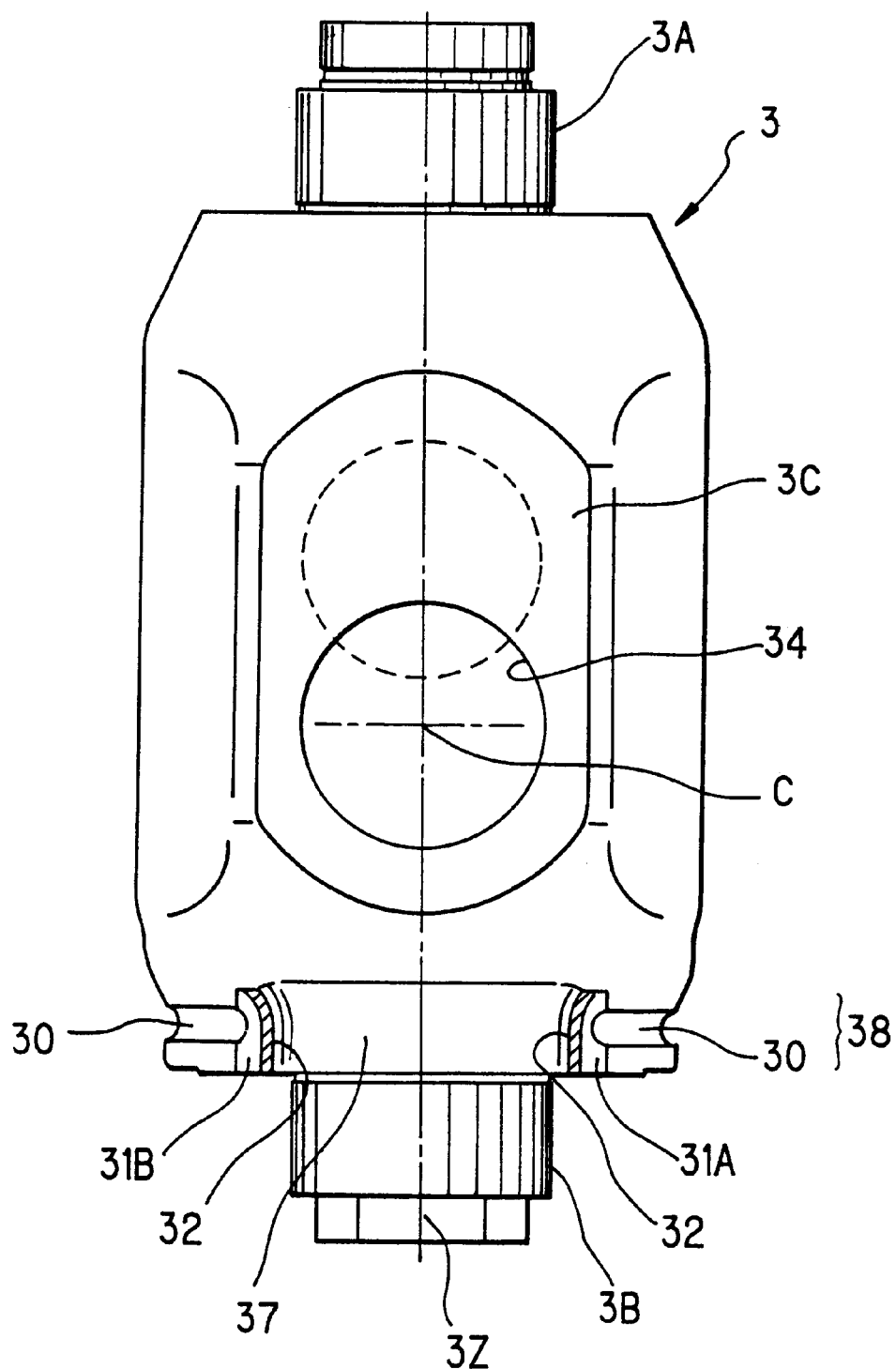
FIG. 3 is a side view of the trunnion.

A pulley 38 is formed in the lower part of the support 3C, as shown in FIG. 3. The pulley 38 comprises a pulley groove 30 and a notch 37 which crosses the pulley groove 30. An endless wire, not shown, is looped around the pulley groove 30 and notch 37 in order to synchronize the gyration angle of the trunnion 3, and the gyration angle of another trunnion, not shown, which is disposed facing the trunnion 3. The endless wire is provided with a large diameter part having a diameter larger than the wire gage, and this large diameter part engages with the notch 37 so that the endless wire does not slide in a circumferential direction relative to the trunnion 3.

The pulley groove 30 and the notch 37 are formed in one piece with the support 3C when the trunnion 3 is formed by die forging.

Figure 4:
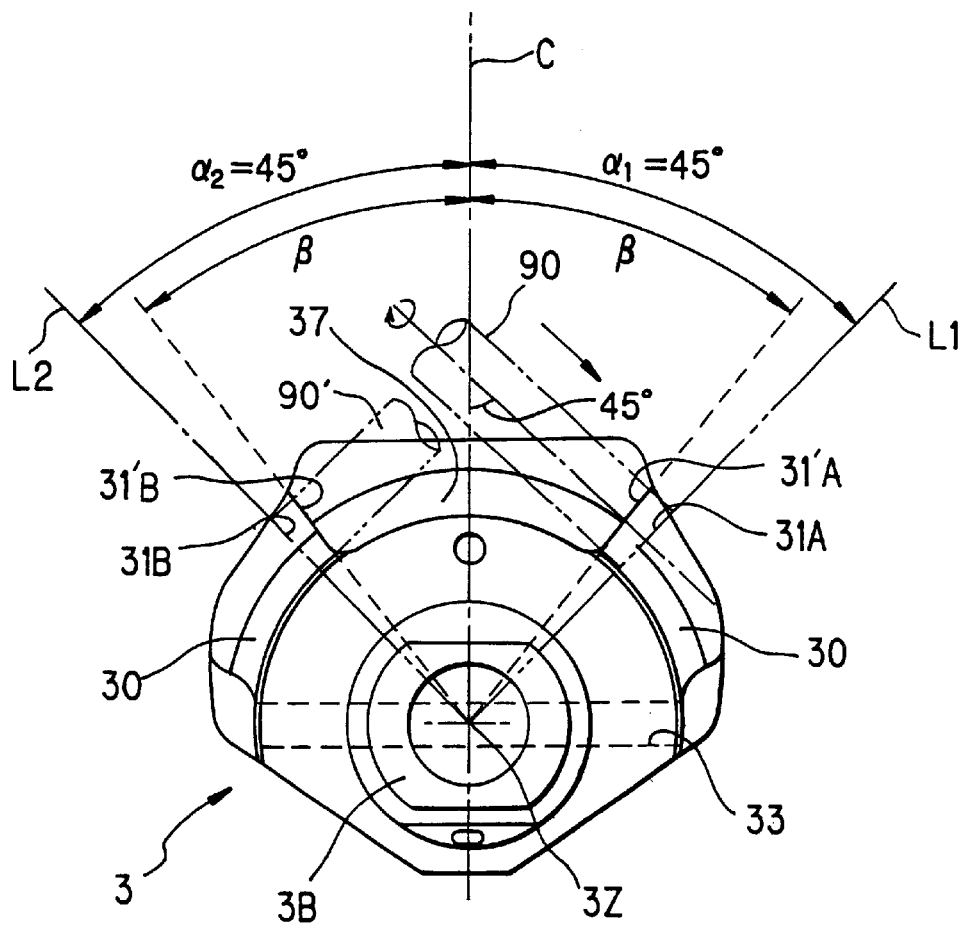
FIG. 4 is a base plan view of the trunnion, showing a state before machining.

After forging, the angles $\beta$ formed by axis C of the pivot 2 and boundary interfaces 31'A, 31'B between the notch 37 and the pulley groove 30 are less than 45 degrees, as shown in FIG. 4. The angles $\beta$ are for example 39 degrees.

Next, machining described later is performed, and the angles between the axis C of the pivot shaft 2 and the boundary interfaces 31A, 31B become $\alpha_1$, $\alpha_2$ as show in FIG. 5. Here, the angles $\alpha_1$, $\alpha_2$ are 45 degrees. Consequently, the angle of the notch 37 is enlarged from $2\beta$ to 90 degrees after forging, and the extension of the boundary interfaces 31A, 31B intersects perpendicularly on the axis 3Z of the trunnion 3.

The machining of the boundary interfaces 31A, 31B will now be described further referring to FIG. 4.

The rotary tool 90 can machine a flat surface by a blade provided on the tip surface. The tool 90 may be an end mill, for example.

First, the boundary interface 31'A on the right-hand side of the figure and the tool 90 are aligned, and the angle between the axis of the tool 90 and the axis C of the pivot shaft 2 is adjusted to a first angle. The first angle is 45 degrees.

The tool 90 is then rotated while moving if forward in the axial direction, and cutting of the boundary interface 31'A is started. When the tip of the tool 90 reaches a line L1 which is at an angle 45 degrees relative to the axis C of the pivot shaft 2, this line extending from the axis 3Z of the trunnion 3, cutting of the boundary interface 31'A is terminated.

Next, the tool 90 is retracted in the axial direction to prevent interference with the trunnion, the trunnion 3 is rotated counterclockwise in the figure, and the angle made by the axis of the tool 90 and the axis C of the point shaft 2 is adjusted to a second angle. The second angle is −45 degrees. Furthermore, the trunnion 3 is displaced parallel so as to face the tool 90.

The tool 90 is then rotated while moving if forward in the axial direction, and cutting of the boundary interface 31'B on the left-hand side of the figure is started. When the tip of the tool 90 reaches a line L2 which makes an angle of 45 degrees relative to the axis C, this line L2 extending from the axis 3Z of the trunnion 3, cutting of the boundary interface 31'B is terminated.

Figure 5:
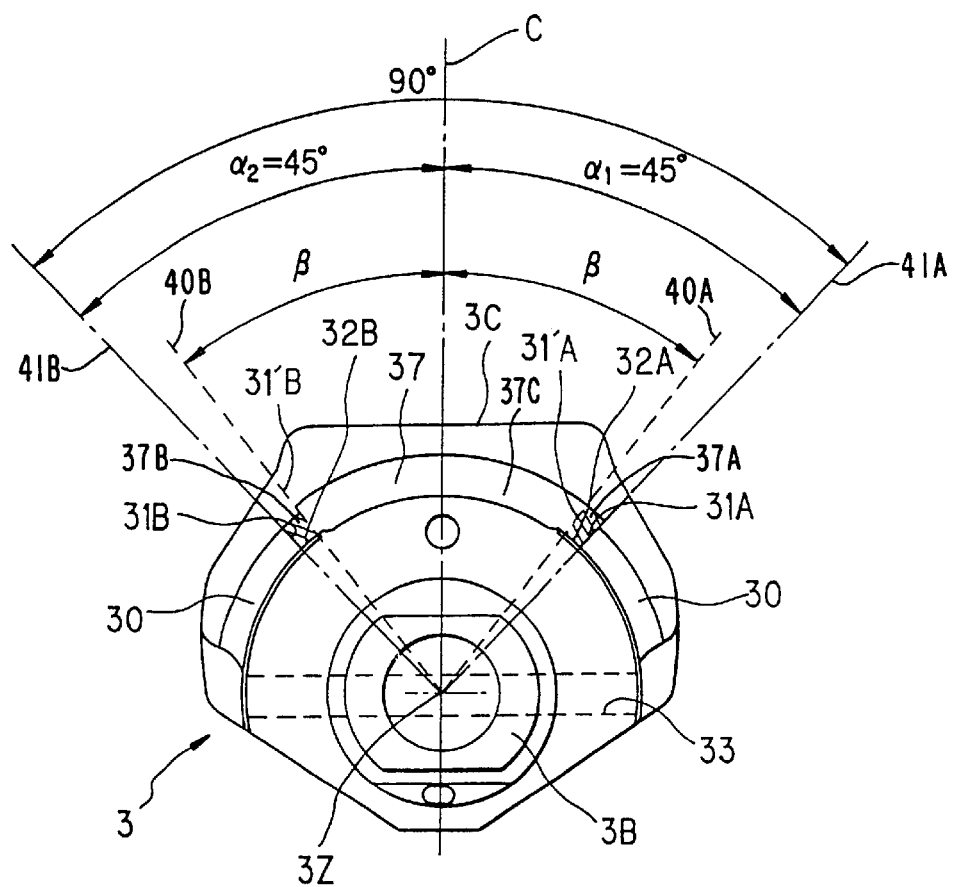
FIG. 5 is a base plan view of the trunnion, showing a state after machining.

Therefore, the angle made by the boundary interfaces 31A, 31B is precisely 90 degrees as shown in FIG. 5 due to the aforesaid double cutting by the tool 90. The shaded portions 32A, 32B in the figure are machining allowances removed by cutting. Accordingly, the shaded portions are formed to be straight.

Therefore, the notch 37 includes an arc portion 37C and two straight portions (37A, 37B) where the arc portion 37C and the two straight portions (37A, 37B) are divided by first boundary surfaces (31'A, 31'B). The notch 37 and the pulley grooves 30 are divided by second boundary surfaces (31A, 31B). The axis C intersects a first imaginary line (40A or 40B) at a first angle B on a sectional plane perpendicular to the axis of the first shaft part. The axis C intersects a second imaginary line (41A or 41B) at a second angle ($\alpha_1$ or $\alpha_2$.

As the relative rotation angle of the trunnion 3 and the tool 90 is 90 degrees, the numerical values used for indexing the cutting position are 45 degrees and 90 degrees, and the work piece can be set easily and quickly.

Moreover, since the tool 90 moves only in the axial direction, the setting of a machine tool, not shown, which drives the tool 90 is easy and accurate.

If the rotary too 90 with a large diameter is used and the offset amount from the center of the pulley groove 30 of the tool 90 is made large, no cutting residues remain below the boundary interfaces 31A, 31B as shown in FIG. 3. Hence, it is possible to prevent the endless wire from being caught on the cutting residues when the endless wire is attached, and it is easy to attach it to the notch 37 precisely and rapidly.

Further, as the machining allowances 32A, 32B are small, the machining time can be reduced. If two of the rotary tools 90 are available, the boundary interfaces 31'A, 31'B can be cut separately at the same time, in which case the machining time may be further reduced.

In the above embodiment, the angles $\alpha_1, \alpha_2$ formed by the axis C of the pivot shaft 2 and the boundary interfaces 31A, 31B are arranged to be 45 degrees, but these angles may be different values. For example, if the angle $\alpha_1$ is set to 30 degrees and the angle $\alpha_2$ is set to 50 degrees, the first and second angles during positioning may be set at respectively 30 degrees and 50 degrees relative to the axis C.

In addition, although the trunnion is formed by die forging in the aforesaid embodiment, it may be molded by casting or sintering instead.

The entire contents of Japanese Patent Application P10-227073 (filed Aug. 11, 1998) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A trunnion of a toroidal continuously variable transmission comprising:
    a support having a hole therethrough comprising a pulley with a pulley groove and a notch crossing said pulley groove;
    a first shaft part on top of said support; and
    a second shaft part on the bottom of said support that is coaxial with said first shaft part;
    wherein said notch comprises an arc portion and two straight portions, one of said straight portion being formed on one side of said arc portion and the other of said straight portion being formed on the other side of said arc portion,
    wherein said arc portion and said straight portions are divided by first boundary surfaces, and said notch and said pulley grooves are divided by second boundary surfaces,
    wherein said hole has an axis,
    wherein said axis intersects a first imaginary line at a first angle on a sectional plane perpendicular to the axis of said first shaft part, said first imaginary line extending from the center of said first shaft part to said first boundary surfaces,
    wherein said axis intersects a second imaginary line at a second angle on said sectional plane, said second imaginary line extending from the center of said first shaft part to said second boundary surface, and
    wherein said first angle is smaller than said second angle.

2. A trunnion of a toroidal continuously variable transmission as defined in claim 1, wherein said second angle is 45 degrees.

3. A manufacturing process for a trunnion of a toroidal continuously variable transmission, said trunnion comprising a pulley with a pulley groove and a notch crossing said pulley groove, said trunnion rotating in synchronism with another trunnion by looping an endless wire around said pulley groove of each trunnion and by engaging a large diameter part of said endless wire with said notch,
    said process comprising:
        forming said pulley groove and said notch by forging, casting or sintering,
        aligning a rotary tool for machining a flat surface by a blade provided on an end face so as to face a boundary interface between said pulley groove and notch; and
        rotating said tool while moving said tool forward in the axial direction of said tool so at to cut said boundary interface to a predetermined position.

4. A manufacturing process for a trunnion for supporting a power roller via a pivot shaft of a toroidal continuously variable transmission, said trunnion comprising a pulley with a pulley groove and a notch crossing said pulley groove, said trunnion rotating in synchronism with another trunnion by looping an endless wire around said pulley groove of each trunnion and by engaging a large diameter part of said endless wire with said notch, said process comprising:
forming said pulley groove and said notch by forging, casting or sintering;
aligning a rotary tool for machining a flat surface by a blade provided on an end face so as to face one boundary interface of boundary interfaces between said pulley groove and said notch;
adjusting an angle formed by an axis of said pivot shaft and an axis of said tool to a first angle;
rotating said tool while moving said tool forward in the axial direction of said tool, and cutting said boundary interface to a predetermined position;
retracting said tool in the axial direction;
rotating and displacing parallel said trunnion so that said tool is facing the other boundary interface;
adjusting an angle formed by said axis of said pivot shaft and said axis of said tool; and
rotating said tool while moving said tool forward in the axial direction of said tool, and cutting said boundary interface to a predetermined position.

5. A manufacturing process as defined in claim 4, wherein, during the cutting of said boundary interface or said boundary interface, cutting is stopped when the tip of said tool reaches a line extending from an axis of the trunnion at a predetermined angle relative to said axis of said pivot shaft.

6. A manufacturing process for a trunnion for supporting a power roller via a pivot shaft of a toroidal continuously variable transmission, said trunnion comprising a pulley with a pulley groove and a notch crossing said pulley groove, said trunnion rotating in synchronism with another trunnion by looping an endless wire around said pulley groove of each trunnion and by engaging a large diameter part of said endless wire with said notch, said process comprising:
forming said pulley groove and said notch by forging, casting or sintering;
aligning a first rotary tool for machining a flat surface by a blade provided on an end face so as to face one boundary interface of said boundary interfaces between said pulley groove and said notch;
adjusting an angle formed by an axis of said pivot shaft and an axis of said tool to a first angle;
rotating said first rotary tool while moving said tool forward in the axial direction of said first rotary tool, and cutting said boundary interface to a predetermined position;
aligning a second rotary tool for machining a flat surface by a blade provided on and end face so as to face the other boundary interface of said boundary interfaces;
adjusting an angle formed by said axis of said pivot shaft and an axis of said second rotary tool to a second angle; and
rotating said second rotary tool while moving said second rotary tool forward in the axial direction of said second rotary tool, and cutting said boundary interface to a predetermined position.

* * * * *